United States Patent
Xu et al.

(10) Patent No.: US 9,338,138 B2
(45) Date of Patent: May 10, 2016

(54) METHOD FOR HIDING SOURCE OF WIRELESS SENSOR NETWORK AND NODE

(71) Applicant: Tsinghua University, Beijing (CN)

(72) Inventors: Ke Xu, Beijing (CN); Wei Tan, Beijing (CN); Wenlong Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/469,680

(22) Filed: Aug. 27, 2014

(65) Prior Publication Data

US 2015/0067841 A1  Mar. 5, 2015

(30) Foreign Application Priority Data

Sep. 3, 2013 (CN) .......................... 2013 1 0395835

(51) Int. Cl.
*H04L 29/06* (2006.01)
*H04W 12/02* (2009.01)
*H04W 84/18* (2009.01)

(52) U.S. Cl.
CPC ........ *H04L 63/0407* (2013.01); *H04L 63/1475* (2013.01); *H04L 63/16* (2013.01); *H04L 63/166* (2013.01); *H04W 12/02* (2013.01); *H04L 63/1491* (2013.01); *H04W 84/18* (2013.01)

(58) Field of Classification Search
CPC ..... H04L 63/16; H04L 63/162; H04L 63/166; H04L 63/18; H04L 63/20
See application file for complete search history.

(56) References Cited

U.S. PATENT DOCUMENTS 6,704,320 B1 *  3/2004  Narvaez et al. ............... 370/408
6,917,974 B1 *  7/2005  Stytz et al. .................... 709/225

* cited by examiner

*Primary Examiner* — Edward Zee

(57) ABSTRACT

A method for hiding a source of a wireless sensor network and a node are provided. The method comprises: determining a first node having a shortest distance from the source; sending a real data packet via a shortest path between the first node and a base station, wherein the real data packet is generated by the first node according to the source; selecting a second node satisfying a preset condition on the shortest path as an initial false source node; establishing a false path with the initial false source node as a terminal node of the false path; and sending a false data packet to the initial false source node via the false path, such that the real data packet is hidden by the false data packet.

10 Claims, 6 Drawing Sheets

METHOD FOR HIDING SOURCE OF WIRELESS SENSOR NETWORK AND NODE

CROSS-REFERENCE TO RELATED APPLICATION

This application claims priority to and benefits of Chinese Patent Application Serial No. 201310395835.7, filed with the State Intellectual Property Office of P. R. China on Sep. 3, 2013, the entire content of which is incorporated herein by reference.

FIELD

The present disclosure relates to a wireless communication technology field, and more particularly to a method for hiding a source of a wireless sensor network and a node.

BACKGROUND

A wireless sensor network includes nodes and base stations. Nodes are the deployed wireless sensors for perceiving events or monitoring environment, and sending the perceived or monitored data to base stations via the multi-hop wireless transmission; and base stations are established for collecting, storing, and processing the perceived or monitored data. However, there are some problems: one aspect is that the wireless sensor network is attacked more easily (e.g. wire-tapped, disturbed, and injected by erroneous data) due to the characteristics of wireless communication, also the privacy leakage from the source (i.e. the monitored object), base stations and the perceived or monitored data may exist in the wireless communication; the other aspect is that the prior security technology can not be applied directly into the wireless sensor network due to disadvantages of the deployed wireless sensors (e.g. small size; limited computing power, storage capacity, and RF communication range; using batteries) and complexity of the wireless sensor network.

Particularly, in some applications of the wireless sensor network, once the location information of the source is leaked, serious safety problems will be caused. For example, when monitoring the endangered animals' habits for scientific research or the real-time battlefield environment by the wireless sensor network, it is important to protect the source in the wireless sensor network. In these applications, once the location information of the source is leaked, it can be used by the attacker (such as hunters or enemies), which makes the source (such as endangered animals or soldiers) easily leaked, thus resulting significant losses.

FIG. 1 is a schematic diagram of the source being traced by the attacker according to a conventional technology. As shown in FIG. 1, the monitored data corresponding to the source is obtained by point 1 which has a shortest distance from the source, and then the monitored data is sent via the wireless link to the base station. As shown in (a) in FIG. 1, the attacker is waiting at the base station to wiretap the monitored data. When the monitored data is wiretapped, the attacker can determine the sending node is point 6 by the radio positioning technology. As shown in (b) in FIG. 1, the attacker can move to point 6 to wiretap the monitored data continually. As shown in (c) in FIG. 1, the attacker can move to point 1 to find the source. Therefore, it can be seen that the source (such as endangered animals or soldiers) is traced more easily by the attacker by the simple routing, in other words, there is no security protection for the source by using the shortest path routing.

SUMMARY

Embodiments of the present disclosure seek to solve at least one of the problems existing in the related art to at least some extent.

A first objective of the present disclosure is to provide a method for hiding a source of a wireless sensor network, which can induce the attacker to trace the source along the false path and can increase the difficulty for tracing the source, and thus can ensure the safety of the source, and also lengthening the safety period.

A second objective of the present disclosure is to provide a node.

According to a first aspect of the present disclosure, a method for hiding a source of a wireless sensor network is provided. The method comprises: determining a first node having a shortest distance from the source; sending a real data packet via a shortest path between the first node and a base station, wherein the real data packet is generated by the first node according to the source; selecting a second node satisfying a preset condition on the shortest path as an initial false source node; establishing a false path with the initial false source node as a terminal node of the false path; and sending a false data packet to the initial false source node via the false path, such that the real data packet is hidden by the false data packet.

In some embodiments, a random value is generated by the second node when the second node receives the real data packet for the first time, and the preset condition is that the random value is less than a preset value.

In some embodiments, establishing a false path with the initial false source node as the terminal node comprises: S1, selecting one from neighbor nodes of the initial false source node as a first false source node, and establishing an initial false path between the first false source node and the initial false source node; S2, selecting one from neighbor nodes of the first false source node as a second false source node when a sending time via the initial false path exceeds a threshold, and extending the initial false path to the second false source node; and S3, repeating S2 until a selected false source node does not have a neighbor node.

In some embodiments, the initial false source node is on the shortest path and the false path, and other nodes on the false path are not on the shortest path.

In some embodiments, a sending period of the false data packet is less than that of the real data packet.

In some embodiments, further comprises obtaining the shortest path between each node of the wireless sensor network and the base station and neighbor nodes of each node.

In some embodiments, obtaining the shortest path between each node of the wireless sensor network and the base station and neighbor nodes of each node comprises: flooding a message by the base station, in which the message comprises a source ID, and the source ID is an ID of a broadcaster; determining whether the message is received for the first time when a node of the wireless sensor network receives the message; if the node receives the message for the first time, adding the source ID of the message to a neighbor node ID list and broadcasting the message after updating the source ID of the message to an ID of the node receiving the message, in which a node corresponding to the source ID is determined as a node on the shortest path; if the node has received the message for at least one time, determining whether the source ID exists in the neighbor node ID list; if the source ID exists in the neighbor node ID list, discarding the message; if the source ID does not exist in the neighbor node ID list, adding the source ID to the neighbor node ID list and discarding the message.

With the method for hiding the source of the wireless sensor network according to embodiments of the present disclosure, by selecting the initial false source node at the shortest path and selecting the new false source node (for example, the first false source node, the second false source node, and so on) constantly according to initial false source nodes to establish the false path, the attacker may be induced to trace the source along the false path, thus ensuring the safety of the source, and also lengthening the safety period.

With the method for hiding the source of the wireless sensor network according to embodiments of the present disclosure, false data packet is sent via the false path, meanwhile, the real data packet is sent via the shortest path, which can reduce the data delay.

The method for hiding the source of the wireless sensor network according to embodiments of the present disclosure is suitable for large-scale wireless sensor networks.

According to a second aspect of the present disclosure, a node is provided. The node comprises: a first receiving module, configured for receiving a real data packet when the node is on a shortest path between a station and a first node having a shortest distance from a source of the real data packet; a generating module, configured for generating a random value when the real data packet is received for the first time; a determining module, configured for determining whether the random value is less than a preset value; an establishing module, configured for establishing a false path by taking the node as a terminal node of the false path when the random value is less than the preset value; and a second receiving module, configured for receiving a false data packet.

In some embodiments, the establishing module comprises: a selecting unit, configured for selecting one from neighbor nodes of the node as a first false source node; and an establishing unit, configured for establishing an initial false path between the first false source node and the node, in which, the first false source node is configured for selecting one from neighbor nodes of the first false source node as a second false source node when a sending time via the initial false path exceeds a threshold, and extending the initial false path to the second false source node, such that the false path is established until a selected false source node does not have a neighbor node.

In some embodiments, other nodes on the false path are not on the shortest path except for the terminal node of the false path.

In some embodiments, a sending period of the false data packet is less than that of the real data packet.

With the node according to embodiments of the present disclosure, by selecting the new false source node (for example, the first false source node, the second false source node, and so on) constantly according to initial false source nodes to establish the false path, the attacker may be induced to trace the source along the false path, thus ensuring the safety of the source, and also lengthening the safety period.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
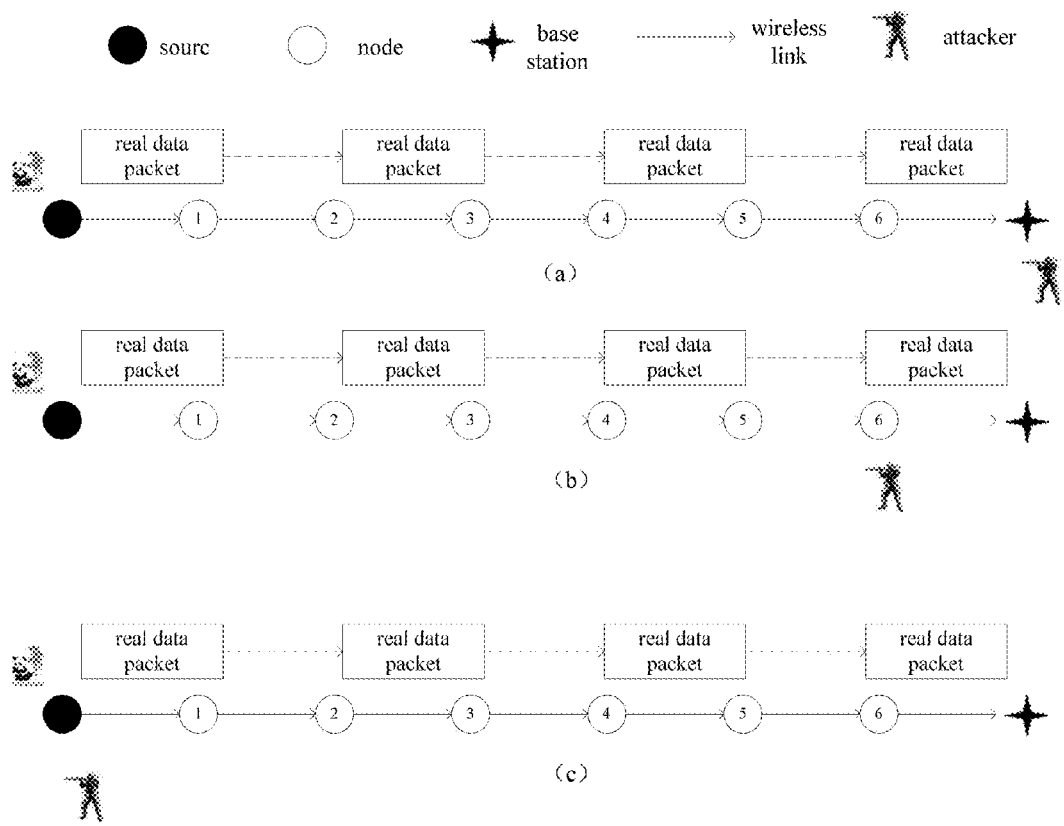
FIG. 1 is a schematic diagram of the source being traced by the attacker according a conventional technology.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the following, a method for hiding a source of a wireless sensor network according to embodiments of the present disclosure will be described in detail with reference to the drawings.

Figure 2:
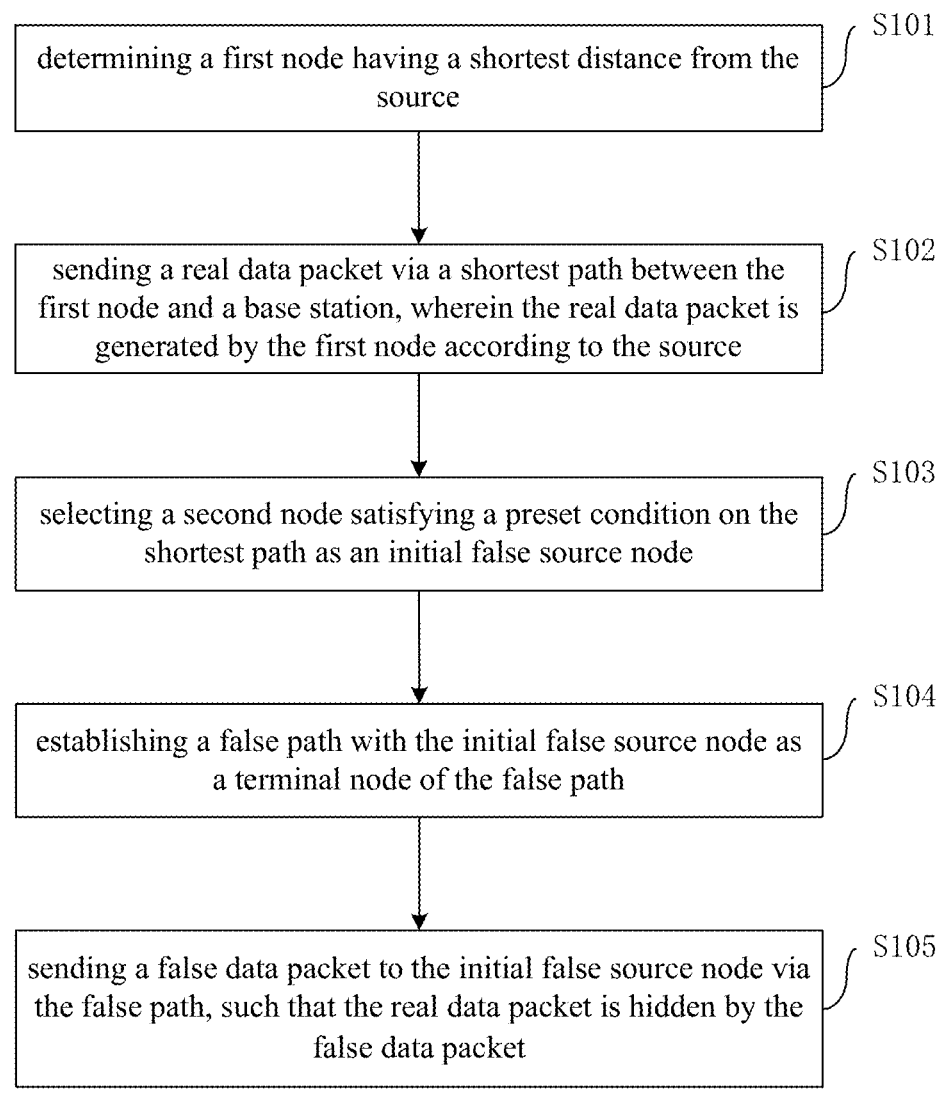
FIG. 2 is a flow chart showing a method for hiding a source of a wireless sensor network according to an embodiment of the present disclosure.
Figure 3:
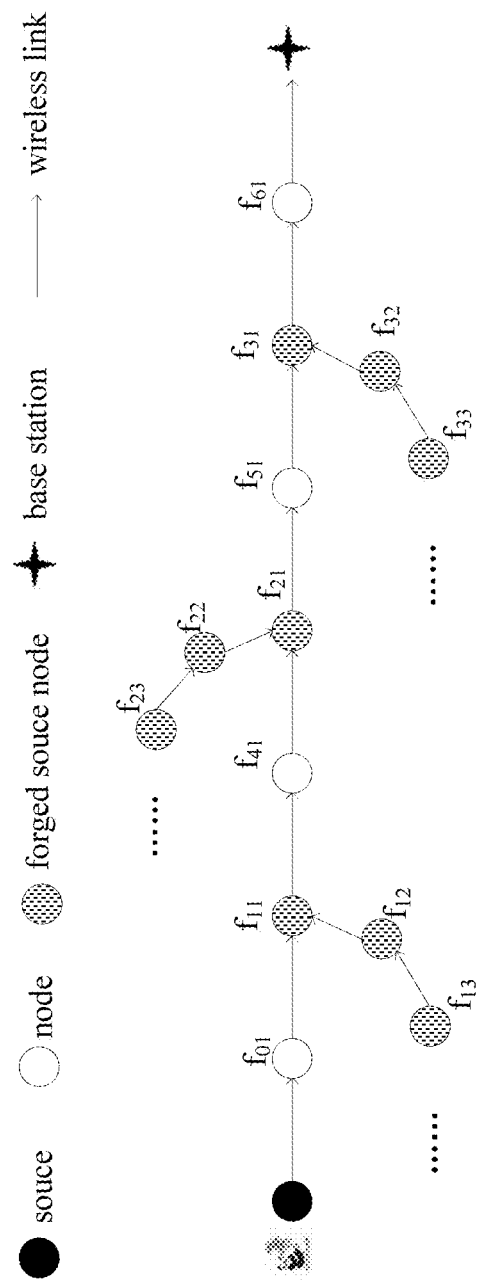
FIG. 3 is a schematic diagram showing a method for hiding a source of a wireless sensor network according to an embodiment of the present disclosure.

FIG. 2 is a flow chart showing a method for hiding a source of a wireless sensor network according to an embodiment of the present disclosure; and FIG. 3 is a schematic diagram showing a method for hiding a source of a wireless sensor network according to an embodiment of the present disclosure.

As shown in FIG. 2, the method includes the following steps.

At step 101, a first node having a shortest distance from the source is determined.

Specifically, the source is the monitored object of the wireless sensor network. When the source occurs within a monitoring scope of the wireless sensor network, the node having a shortest distance from the source is determined as the first node. For example, as shown in FIG. 3, point $f_{01}$ is determined as the first node.

At step 102, a real data packet is sent via a shortest path between the first node and a base station, in which the data event packet is generated by the first node according to the source.

In some embodiments, the real data packet also includes a timestamp and a first node ID. For example, as shown in FIG. 3, the shortest path is the path along $f_{01}f_{11}f_{41}f_{21}f_{51}f_{31}f_{61}$ between point $f_{01}$ and the base station.

At step 103, a second node satisfying a preset condition on the shortest path is selected as an initial false source node.

In some embodiments, a random value is generated by the second node when the second node receives the real data packet for the first time, and the preset condition is that the random value is less than a preset value. For example, the random value p' is generated by second node when the second node receives the real data packet for the first time, the random value p' can be in the range of 0 to 1, and the preset value p is a system parameter of the wireless sensor network which is determined at the deployment time and is saved in each node of the wireless sensor network. If p'<p, the second node is selected as one initial false source node. For example, as shown in FIG. 3, point $f_{11}$, point $f_{21}$ and point $f_{31}$ are selected as initial false source nodes.

At step 104, a false path with the initial false source node as a terminal node of the false path is established.

For example, as shown in FIG. 3, the path along $f_{13}f_{12}f_{11}$ is established as one false path with the initial false source node $f_{11}$ as a terminal node, the path along $f_{23}f_{22}f_{21}$ is established as another false path with the initial false source node $f_{21}$ as a terminal node, and the path along $f_{33}f_{32}f_{31}$ is established as yet another false path with the initial false source node $f_{31}$ as a terminal node.

Figure 4:
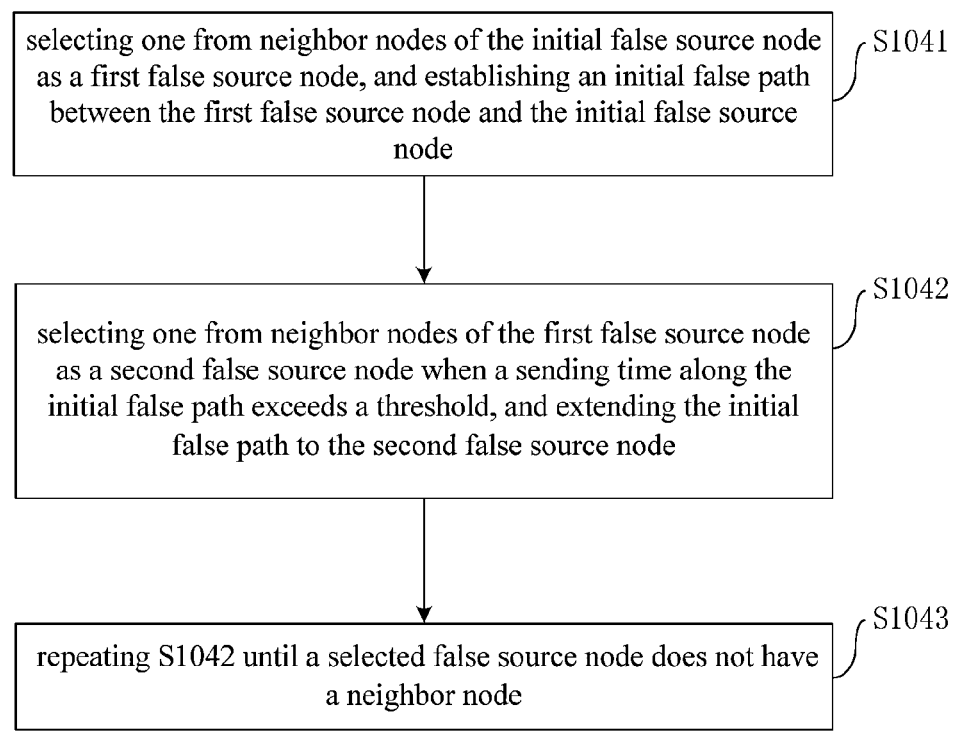
FIG. 4 is a flow chart showing step 104 in FIG. 2 according to an embodiment of the present disclosure.

FIG. 4 is a flow chart showing step 104 in FIG. 2 according to an embodiment of the present disclosure. As shown in FIG. 4, step 104 includes the following steps.

At step 1041, one from neighbor nodes of the initial false source node is selected as a first false source node, and an initial false path between the first false source node and the initial false source node is established.

At step 1042, one from neighbor nodes of the first false source node is selected as a second false source node when a sending time via the initial false path exceeds a threshold, and the initial false path is extended to the second false source node.

At step 1043, step 1042 is repeated until a selected false source node does not have a neighbor node.

For example, firstly, point $f_{11}$ is selected as one initial false source node, point $f_{12}$ is selected as one first false source node from neighbor nodes of point $f_{11}$, and then one initial false path is the path along $f_{12}f_{11}$; then, when the sending time via the initial false path $f_{12}f_{11}$ exceeds the threshold, point $f_{13}$ is selected as one second false source node from neighbor nodes of point $f_{12}$, and then the initial false path $f_{12}f_{11}$ is extended to the second false source node $f_{12}$, that is to say the second initial false path $f_{13}f_{12}f_{11}$ is used instead of the initial false path $f_{12}f_{11}$, and the above procedure is repeated until a selected false source node does not have a neighbor node.

In some embodiments, the initial false source node is on the shortest path and the false path, and other nodes on the false path are not on the shortest path. That can avoid forming a loop which enables the attacker to find himself falls in the false path.

In some embodiments, when the selected false source node does not have the neighbor node, the false path is stopped to be extended, so the selected false source node no longer sends data via the false path and the false path will disappear in the wireless sensor network.

At step 105, a false data packet is sent to the initial false source node via the false path, such that the real data packet is hidden by the false data packet.

In some embodiments, the false data packet also includes the timestamp and the sending node ID. For example, as shown in FIG. 3, one false data packet is sent along $f_{13}f_{12}f_{11}$ from point $f_{13}$ to point $f_{11}$, another false data packet is sent along $f_{23}f_{22}f_{21}$ from point $f_{23}$ to point $f_{21}$, yet another false data packet is sent along $f_{33}f_{32}f_{31}$ from point $f_{33}$ to point $f_{31}$.

In some embodiments, a sending period of the false data packet is less than that of the real data packet. When one initial false source node is traced by the attacker, the real data packet or the false data packet can be obtained by the attacker. If the sending period of the false data packet is less than that of the real data packet, the false data packet is more likely to be obtained, which causes the attacker to trace along the false path but away from the shortest path and the source.

With the method for hiding the source of the wireless sensor network according to embodiments of the present disclosure, by selecting the initial false source node at the shortest path and selecting the new false source node (for example, the first false source node, the second false source node, and so on) constantly according to initial false source nodes to establish the false path, the attacker may be induced to trace the source along the false path, thus ensuring the safety of the source, and also lengthening the safety period.

With the method for hiding the source of the wireless sensor network according to embodiments of the present disclosure, the false data packet is sent via the false path, meanwhile, the real data packet is sent via the shortest path, which can reduce the data delay.

The method for hiding the source of the wireless sensor network according to embodiments of the present disclosure is suitable for the large-scale wireless sensor network.

In some embodiments, the method for hiding the source of the wireless sensor network further includes step 106 (not shown in Fig.). At step 106, the shortest path between each node of the wireless sensor network and the base station and neighbor nodes of each node are obtained. The step 106 can be executed at the deployment of the wireless sensor network; also an ID for the base station and an ID for each node are assigned at the deployment time, and an ID for each node can be stored in the base station.

Figure 5:
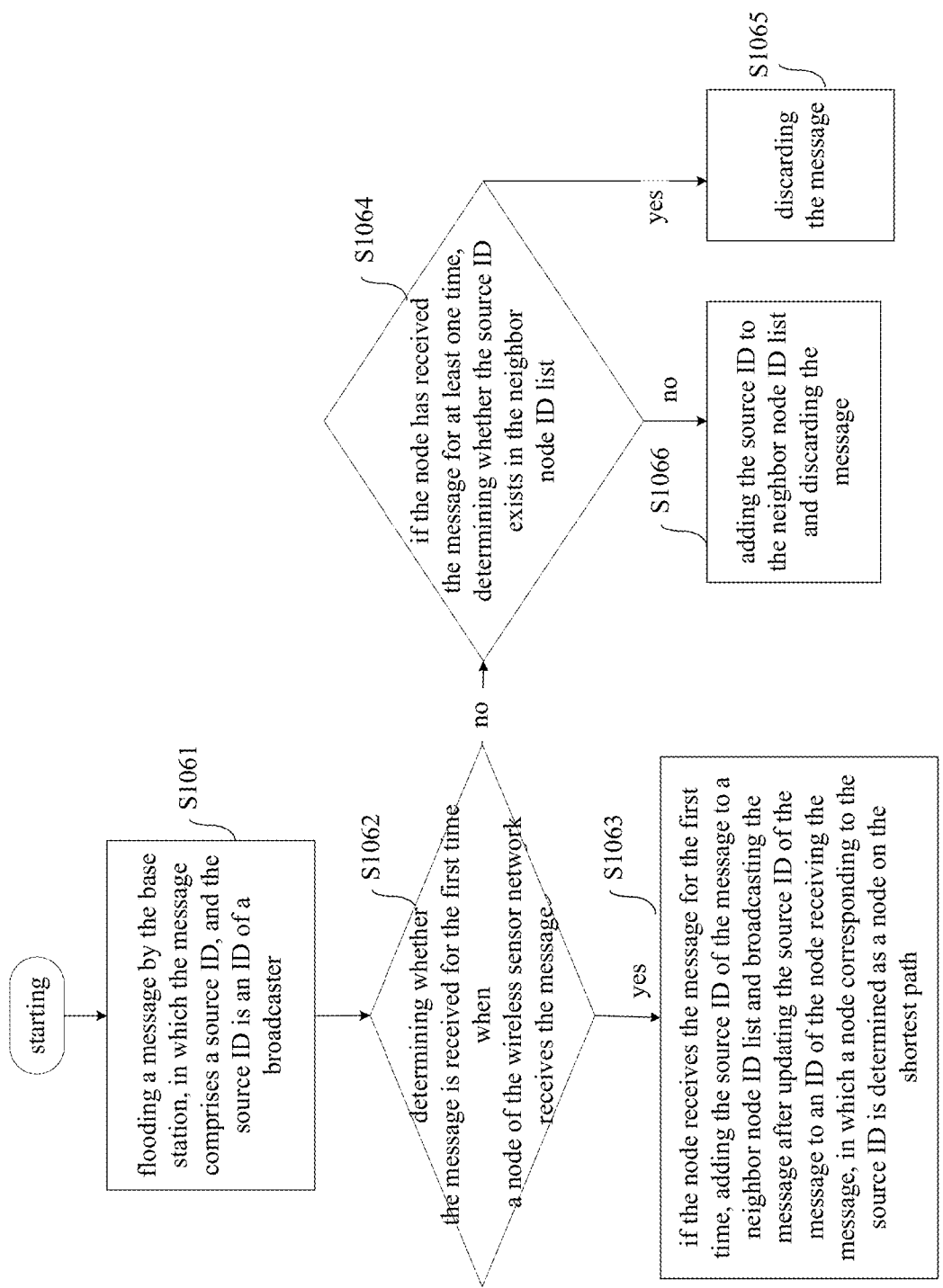
FIG. 5 is a flow chart showing step 106 according to an embodiment of the present disclosure.

FIG. 5 is a flow chart showing step 106 according to an embodiment of the present disclosure.

As shown in FIG. 5, step 106 includes the following steps.

At step 1061, a message is flooded by the base station, in which the message comprises a source ID, and the source ID is an ID of a broadcaster.

At step 1062, whether the message is received for the first time when a node of the wireless sensor network receives the message is determined.

At step 1063, if the node receives the message for the first time, the source ID of the message is added to a neighbor node ID list and the message is broadcasted after updating the source ID of the message to an ID of the node receiving the message, in which a node corresponding to the source ID is determined as a node on the shortest path.

At step 1064, if the node has received the message for at least one time, whether the source ID exists in the neighbor node ID list is determined.

At step 1065, if the source ID exists in the neighbor node ID list, the message is discarded.

At step 1066, if the source ID does not exist in the neighbor node ID list, the source ID is added to the neighbor node ID list and the message is discarding.

Thus, after flooding the message, each node can store its own neighbor node ID to the neighbor node ID list and the shortest path from each node to the base station can be obtained.

In the following, a node according to embodiments of the present disclosure will be described in detail with reference to the drawings.

Figure 6:
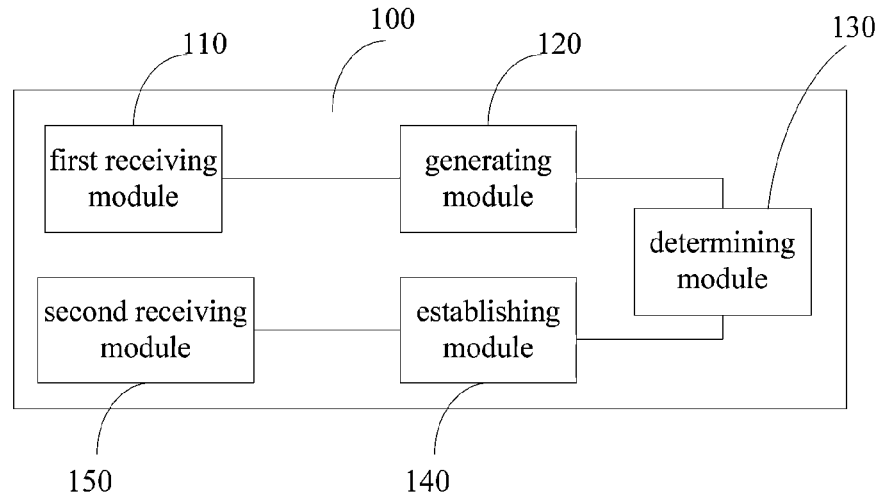
FIG. 6 is a block diagram of a node according to an embodiment of the present disclosure.

FIG. 6 is a block diagram of a node according to an embodiment of the present disclosure.

As shown in FIG. 6, the node 100 comprises a first receiving module 110, a generating module 120, a determining module 130, an establishing module 140 and a second receiving module 150.

Specifically, the first receiving module 110 is configured for receiving a real data packet when the node 100 is on a shortest path between a station and a first node having a shortest distance from a source of the real data packet.

The generating module 120 is configured for generating a random value when the real data packet is received for the first time. For example, the random value p can be generated by the generating module 120 which is in the range of 0 to 1.

The determining module 130 is configured for determining whether the random value is less than a preset value. For example, the preset value p is a system parameter of the wireless sensor network which is determined at the deployment time and is saved in each node of the wireless sensor network, and the determining module 130 determines whether the random value p is less than a preset value p.

The establishing module 140 is configured for establishing a false path by taking the node 100 as a terminal node of the false path when the random value is less than the preset value. For example, if the determining module 130 determines that p'<p, the establishing module 140 establishes the false path.

The second receiving module 150 is configured for receiving a false data packet. Specifically, the false data packet can be sent long the false path, so the second receiving module 150 can receive that.

Figure 7:
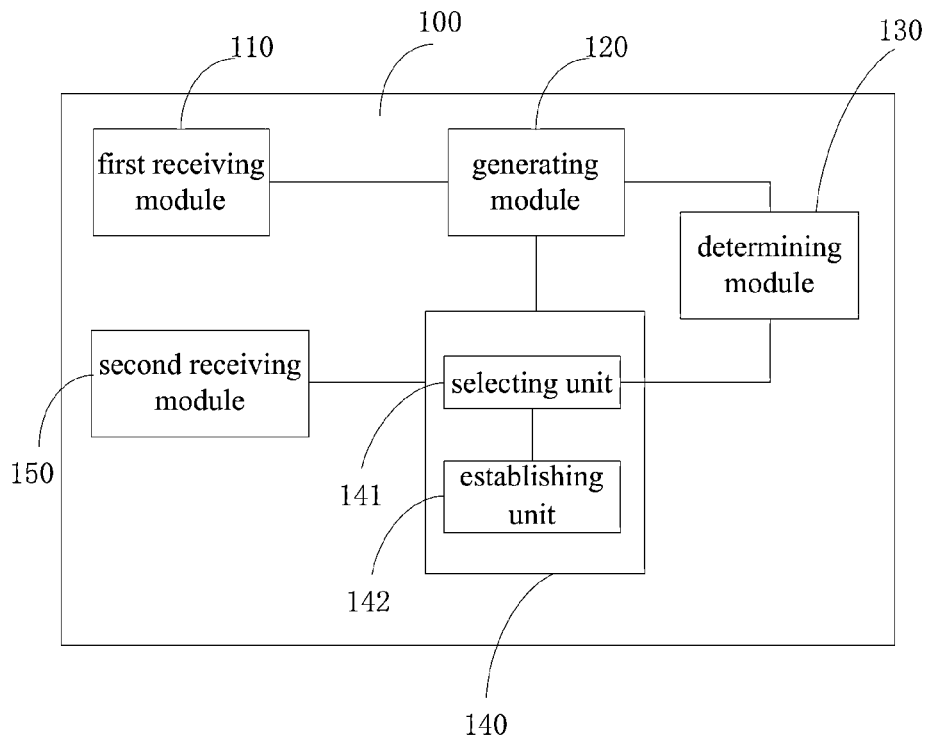
FIG. 7 is a block diagram of a node according to another embodiment of the present disclosure.

FIG. 7 is a block diagram of a node according to another embodiment of the present disclosure.

As shown in FIG. 7, the node 100 comprises the first receiving module 110, the generating module 120, the determining module 130, the establishing module 140 and the second receiving module 150, in which the establishing module 140 comprises a selecting unit 141 and an establishing unit 142.

Specifically, the selecting unit 141 is configured for selecting one from neighbor nodes of the node as a first false source node.

The establishing unit 142 is configured for establishing an initial false path between the first false source node and the node, in which, the first false source node is configured for selecting one from neighbor nodes of the first false source node as a second false source node when a sending time via the initial false path exceeds a threshold, and extending the initial false path to the second false source node until a selected false source node does not have a neighbor node such that the false path is established.

In some embodiments, other nodes on the false path are not on the shortest path except for the terminal node of the false path. That can avoid forming a loop which enables the attacker to find himself falls in the false path.

In some embodiments, a sending period of the false data packet is less than that of the real data packet. When one initial false source node is traced by the attacker, the real data packet or the false data packet can be obtained by the attacker, if the sending period of the false data packet is less than that of the real data packet, the false data packet is more likely to be obtained, which causes the attacker to trace along the false path but away from the shortest path and the source.

With the node according to embodiments of the present disclosure, by selecting the new false source node (for example, the first false source node, the second false source node, and so on) constantly according to initial false source nodes to establish the false path, the attacker may be induced to trace the source along the false path, thus ensuring the safety of the source, and also lengthening the safety period.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for hiding a source of a wireless sensor network, comprising:
    determining a first node having a shortest distance from the source;
    sending a real data packet via a shortest path between the first node and a base station, wherein the real data packet is generated by the first node according to the source;
    selecting a second node satisfying a preset condition on the shortest path as an initial false source node, wherein a random value is generated by the second node when the second node receives the real data packet for the first time, and the preset condition is that the random value is less than a preset value;
    establishing a false path with the initial false source node as a terminal node of the false path; and
    sending a false data packet to the initial false source node via the false path, such that the real data packet is hidden by the false data packet.

2. The method according to claim 1, wherein establishing a false path with the initial false source node as the terminal node comprises:
    S1, selecting one from neighbor nodes of the initial false source node as a first false source node, and establishing an initial false path between the first false source node and the initial false source node;
    S2, selecting one from neighbor nodes of the first false source node as a second false source node when a sending time via the initial false path exceeds a threshold, and extending the initial false path to the second false source node; and
    S3, repeating S2 until a selected false source node does not have a neighbor node.

3. The method according to claim 1, wherein the initial false source node is on the shortest path and the false path, and other nodes on the false path are not on the shortest path.

4. The method according to claim 1, wherein a sending period of the false data packet is less than that of the real data packet.

5. The method according to claim 1, further comprising:
    obtaining the shortest path between each node of the wireless sensor network and the base station and neighbor nodes of each node.

6. The method according to claim 5, wherein obtaining the shortest path between each node of the wireless sensor network and the base station and neighbor nodes of each node comprises:
    flooding a message by the base station, in which the message comprises a source ID, and the source ID is an ID of a broadcaster;
    determining whether the message is received for the first time when a node of the wireless sensor network receives the message;
    if the node receives the message for the first time, adding the source ID of the message to a neighbor node ID list and broadcasting the message after updating the source ID of the message to an ID of the node receiving the message, in which a node corresponding to the source ID is determined as a node on the shortest path;
    if the node has received the message for at least one time, determining whether the source ID exists in the neighbor node ID list;
    if the source ID exists in the neighbor node ID list, discarding the message;
    if the source ID does not exist in the neighbor node ID list, adding the source ID to the neighbor node ID list and discarding the message.

7. A node, comprising:
    a first receiving module, configured for receiving a real data packet when the node is on a shortest path between a station and a first node having a shortest distance from a source of the real data packet;
    a generating module, configured for generating a random value when the real data packet is received for the first time;
    a determining module, configured for determining whether the random value is less than a preset value;
    an establishing module, configured for establishing a false path by taking the node as a terminal node of the false path when the random value is less than the preset value; and
    a second receiving module, configured for receiving a false data packet.

8. The node according to claim 7, wherein the establishing module comprises:
    a selecting unit, configured for selecting one from neighbor nodes of the node as a first false source node; and
    an establishing unit, configured for establishing an initial false path between the first false source node and the node, in which, the first false source node is configured for selecting one from neighbor nodes of the first false source node as a second false source node when a sending time via the initial false path exceeds a threshold, and extending the initial false path to the second false source node, such that the false path is established until a selected false source node does not have a neighbor node.

9. The node according to claim 7, wherein other nodes on the false path are not on the shortest path except for the terminal node of the false path.

10. The node according to claim 7, wherein a sending period of the false data packet is less than that of the real data packet.

\* \* \* \* \*